United States Patent [19]

Green

[11] Patent Number: 4,503,726
[45] Date of Patent: Mar. 12, 1985

[54] SELF-TENSIONING MOTOR TRANSMISSION CONTROL SYSTEM

[75] Inventor: Edward A. Green, Mantua, Ohio

[73] Assignee: Eaton Corporation, Cleveland, Ohio

[21] Appl. No.: 274,912

[22] Filed: Jun. 18, 1981

[51] Int. Cl.³ .............................................. B60K 20/04
[52] U.S. Cl. ................... 74/473 R; 74/501 R; 74/501.5 R
[58] Field of Search .......... 74/471 XY, 473 R, 473 P, 74/473 SW, 501 R, 501.5; 33/27 L, 23 B, 23 E, 23 J

[56] References Cited

U.S. PATENT DOCUMENTS

| | | | |
|---|---|---|---|
| 1,270,163 | 6/1918 | Jesurun et al. | 74/501 |
| 1,490,206 | 4/1924 | Church. | |
| 2,206,474 | 7/1940 | Bowers et al. | 74/471 XY |
| 2,402,724 | 6/1946 | Bidwell | 74/501 |
| 2,545,258 | 3/1951 | Cailloux | 33/23 J |
| 2,847,871 | 8/1958 | Schick | 74/477 |
| 2,847,874 | 8/1958 | McCordic et al. | 74/502 |
| 2,917,941 | 12/1959 | Wittren | 74/473 |
| 2,961,890 | 12/1960 | Marshall | 74/477 |
| 3,253,481 | 5/1966 | Warhol | 74/501 M |
| 3,393,579 | 7/1968 | Wolf | 74/501 |
| 3,520,208 | 7/1970 | Davis et al. | 74/473 |
| 3,605,520 | 9/1971 | Lorenz et al. | 74/473.5 W |
| 3,966,162 | 6/1976 | Hadley | 74/471 XY |
| 4,152,950 | 5/1979 | Langford | 74/471 XY |
| 4,155,273 | 5/1979 | Cosh | 74/501 M |
| 4,238,972 | 12/1980 | Hemens | 74/473 P |
| 4,348,915 | 9/1982 | Leitermann et al. | 74/473 R |

FOREIGN PATENT DOCUMENTS 1595342  8/1981  United Kingdom ............ 74/501 R

*Primary Examiner*—Leslie A. Braun
*Assistant Examiner*—Michael J. Gonet
*Attorney, Agent, or Firm*—C. H. Grace; A. E. Chrow

[57] ABSTRACT

Disclosed is a self-tensioning motor transmission control system having a manually positioned driver member that moves planarly to remotely move a driven member that is operably connected to a gear change mechanism and moves planarly to effect a change in the transmission gears by means of a plurality of flexible force transmitting members, such as cables, that are connected to the driver and driven members in such a manner that the force transmitting members are self-tensioning and are subjected only to tensional pulling forces.

16 Claims, 7 Drawing Figures

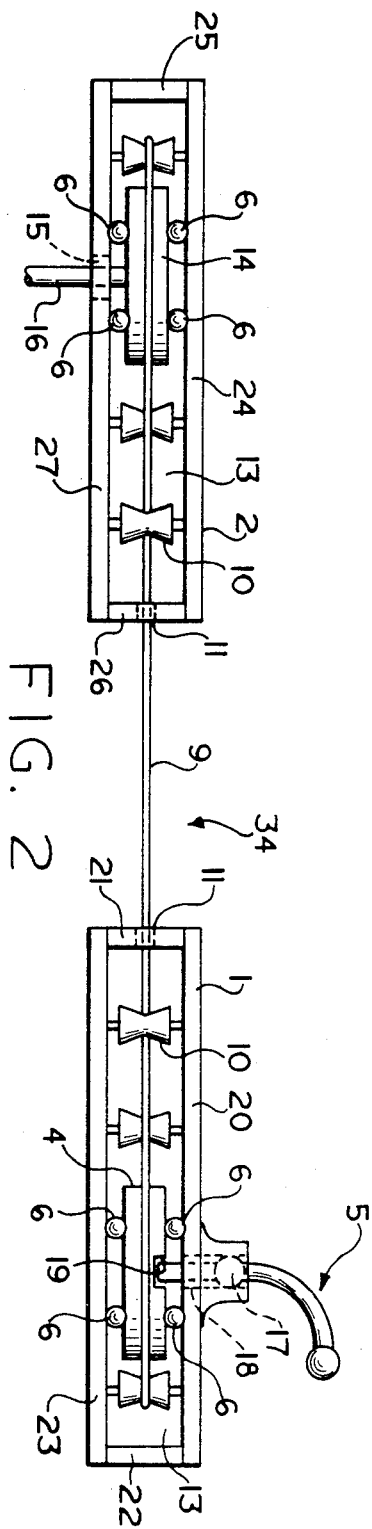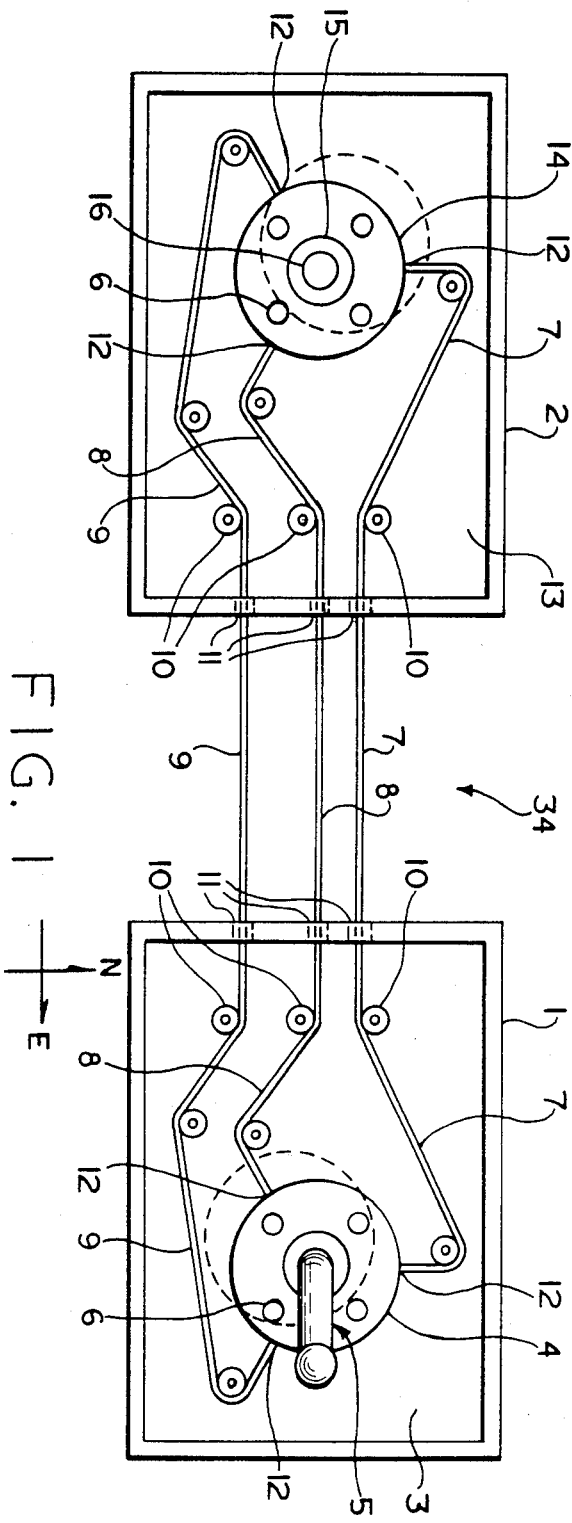

SELF-TENSIONING MOTOR TRANSMISSION CONTROL SYSTEM

INTRODUCTION

This invention relates generally to a control system for selectively changing the gears of a motor transmission and more particularly to a self-tensioning control system for remotely controlling a motor transmission gear change mechanism in which the mechanism is actuated by a driven member that is moved and positioned only by tensional pulling forces transmitted thereto by means of a plurality of force transmitting members connected to a driver member of the system that is moved manually.

BACKGROUND OF THE INVENTION

Control systems of various types have been used for many years to effect gear changes in motor transmissions by imposing both pushing and pulling forces upon the transmission gear change mechanism. Such systems are disclosed for example in U.S. Pat. No. 1,490,206 where shift bars are pushed and pulled by a pivotally mounted lever arm to effect a change in gears of a motor vehicle transmission. U.S. Pat. No. 2,847,871 discloses a shifting mechanism similar to that disclosed in U.S. Pat. No. 1,490,206 with the addition of a positive lock and detent mechanism for the shift rods that holds the balance of the shift rods in a fixed position when one of the rods is being pushed or pulled.

Examples of transmission control mechanisms utilizing a single control cable that is pushed and pulled to effect a transmission gear change are disclosed respectively in U.S. Pat. Nos. 2,847,874 and 3,520,208. Examples of transmission control systems that feature two push rods and two control cables that are both pushed and pulled to effect a transmission gear change are disclosed respectively in U.S. Pat. Nos. 2,961,890 and 2,917,941.

The above described transmission control mechanisms are typical of the art up to the time of the present invention in that all require that both pushing and pulling forces of some type be transmitted through the connecting members to the transmission gear change mechanism to effect a change in the transmission gears and are unable to effect a change to all of the other gear positions by applying only tensional pulling forces alone to the transmission gear change mechanism. The transmission control system of the present invention eliminates the need to apply pushing forces to the transmission gear change mechanism and applys only tensional pulling forces to effect a change of gears in a motor transmission to any one of a plurality of gear positions. The elimination of the requirement of having to impose pushing forces upon the force transmitting connecting members is particularly advantageous where flexible cables are used as the connecting members since flexible cables are subject to backlash when the force applied to the cables is reversed from a pushing force to a tensional pulling force.

SUMMARY OF THE INVENTION

Accordingly, it is an object of this invention to provide a self-tensioning control system for controlling a motor transmission gear change mechanism that is able to effect a change in the transmission gears to any one of a plurality of gear positions by imposing only tensional pulling forces upon the gear change mechanism.

It is another object of the invention to provide a self-tensioning control system for controlling a motor transmission gear change mechanism that is able to effect a change in the transmission gears to any one of a plurality of gear positions by imposing only tensional pulling forces on a plurality of force transmitting members connected to a driven member that is operably connected to the gear change mechanism and thereby eliminates the requirement of having to apply both pushing and pulling forces to the force transmitting connecting members.

It is yet a further object of this invention to tensional pulling forces upon a plurality of force transmitting flexible cables connected to a driven member that is connected to the gear change mechanism and thereby eliminate the disadvantages of having to apply pushing forces to the flexible cables.

BRIEF DESCRIPTION OF THE DRAWINGS

FIG. 1 shows a plan view of an embodiment of the transmission control system of the invention with the top removed;

FIG. 2 shows a side elevation view of the embodiment of FIG. 1 with one of the sides removed;

DETAILED DESCRIPTION OF THE PREFERRED EMBODIMENTS

Figure 3:
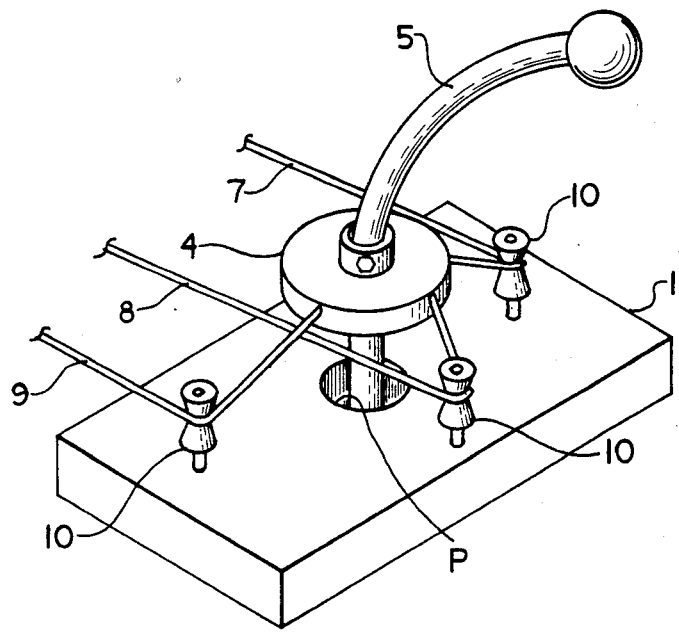
FIG. 3 shows a partial perspective view of an embodiment of a means for manually moving a driver member of the control system of the invention.

FIGS. 1 and 2 show an embodiment of transmission control system 34 of the invention having a first support member 1 and a second support member 2 with their respective tops removed in FIG. 1 and one side removed in FIG. 2. Support member 1 has cavity 3 enclosed by top wall 20, side walls 21 and 22, and bottom wall 23 shown in FIG. 2. Driver member 4 in the form of a circular plate is disposed in cavity 3 of support member 1 by the rolling engagement provided by ball bearings 6 disposed between driver member 4 and top cover 20 and between driver member 4 and bottom wall 23 of support member 1. Driver member 4 is moved planarly a predetermined distance within cavity 3 by means of manual control means operably engaged with member 4. The control means is in the form of the lever 5 that is moved according to a predetermined pattern required for moving the gears of the transmission being controlled by system 34 into any one of a plurality of gear positions available from the transmission. The predetermined pattern may for example be described on a register plate (not shown) for locating lever 5 in the desired gear position. Lever 5 passes into cavity 3 through opening 18 in top wall 20 and operably engages driver member 4 in bore 19 in the top surface of member 4 shown in FIG. 2. Lever 5 is pivotally mounted to support member 1 by means of ball 17 disposed in opening 18 and is able to pivot and move driver member 4 in a planar manner by engagement of the end of lever 5 against the sidewalls of bore 19 in driver member 4. Although the means of pivoting lever 5 is shown in FIG. 2 as ball 17, any suitable means of pivoting lever 5 to produce a planar movement of member 4 is considered within the scope of the invention. Thus, driver member 4 is caused to move in a direction opposite to the direction of movement of lever 5 above ball 17 for the embodiment of system 34 shown in FIGS. 1 and 2.

Force transmitting connecting members 7, 8 and 9 in the form of flexible cables are connected to driver member 4 at locations 12 located circumferentially equidistant from each other around the outer circumference of the circular configuration of member 4. Cables 7, 8 and 9 exit from cavity 3 of member 1 through openings 11 in side wall 21 and individually connect member 4 to driven member 14 in cavity 13 of support member 2. Cavity 13 is enclosed by the top wall 24, side walls 25 and 26 and bottom wall 27 of member 2. Cables 7, 8 and 9 pass into cavity 13 through openings 11 in side wall 26 and connect to member 14 at about the same respective locations 12 as they are respectively connected to member 4. Cables 7, 8 and 9 are directed within cavities 3 and 13 by means of rollers 10. Shaft 16, shown in FIG. 2, extends downwardly from member 14 through opening 15 in bottom wall 27 of member 2. The end of shaft 16 is adapted to operably engage with a gear change mechanism (not shown) such as for example shifting rails of a manual transmission. Member 14 is moveably engaged with member 2 by the rolling engagement provided by ball bearings 6 disposed between the inner surface of top member 24 and the top of member 14 and between the bottom of member 14 and bottom wall 27. Opening 15 is large enough to permit shaft 16 to move sufficiently to cause the gear change mechanism to shift in any one of a plurality of gears required from the transmission.

Cables 7, 8 and 9 may be connected to members 4 and 14 at locations 12 in any suitable manner such as for example by suitable fittings secured to members 4 and 14. It is readily seen that member 14 will move planarly in response to the planar movement of member 4 by means of the forces transmitted to member 14 through cables 7, 8 and 9. It is also readily seen from the particular position chosen to connect cables 7, 8 and 9 to members 4 and 14 that regardless of the direction in which member 4 is moved, only tensional pulling forces are imposed upon member 14, shaft 16 and the transmission gear change mechanism (not shown) to which shaft 16 is operably engaged. Thus, for example, movement of lever 5 toward the Northeast causes member 4 to be moved toward the Southwest (shown in dashed position). Movement of member 4 to the Southwest applies a substantially equal pulling force to cables 7 and 9 which pull member 14 to the Northwest (shown in dashed position) which in turn pulls cable 8 to take up the slack in cable 8 caused by the movement of member 4 to the Southwest. Thus member 4 is not required to push upon cable 8 due to the pulling force applied upon cable 8 by member 14 which eliminates any backlash associated with both pulling and pushing cable 8 and causes cable 8 to be self-tensioning.

Although it is preferred to connect cables 7, 8 and 9 circumferentially equidistant from each other in approximately the same locations respective to members 4 and 14, it is to be understood that cables 7, 8 and 9 may be connected to members 4 and 14 at any position with respect to each other provided that the movement required of member 4 and 14 to effect the gear changes desired only imposes tensional pulling forces upon member 14 and cables 7, 8 and 9.

Although members 4 and 14 are shown in FIGS. 1 through 6 as having a circular configuration, members 4 and 14 may have any configuration that suitably provides the ability of member 14 to move in response to movement of member 4 in the manner desired. Likewise, although it is preferred to use at least 3 flexible cables such as cables 7, 8 and 9 for the force transmitting connecting members between members 4 and 14, the force transmitting connecting members may be in the form of other types of flexible connecting linkages such as rods and the like provided they are subjected only to tensional pulling forces in accordance with the invention.

In cases where flexible cables are used as the force transmitting connecting members of the control system of the invention, the cables may be solid or stranded wire cables made from metal or other materials having the properties desired for a particular application. Cables preferred for use as the force transmitting connecting members of the invention are of the type which feature a slideable inner member enclosed by a protective outer jacket in which case the jacket is usually fixed at an appropriate place on support members 1 and 2 or other convenient non-moving location and only the inner slideable member is connected to the driver and driven members of the control system of the invention.

It is to be further understood that the manual means for moving member 4 shown in the Figures in the form of lever 5 may be any suitable means for moving member 4 and is not limited to the pivotally mounted type of lever 5 shown in the figures but may for example be in the form of a slide track and may further provide for the driven and driver members of the control system of the invention to move in different planes with respect to each other as for example where the driver member moves in a horizontal plane and the driven member is caused to move in a plane perpendicular to the horizontal plane.

It is also to be understood that FIGS 1. and 2 illustrate only one embodiment of the invention and that any suitable tyep of support members and means for providing the ability of both the driver member 4 and driven member 14 of the control system of the invention to move with respect to the support members is considered within the scope of the invention.

FIG. 3 illustrates an embodiment of the control system of the invention where driver member 4 is mounted on manual control means in the form of lever 5. Lever 5 is pivotally mounted to support member 1 by suitable pivoting means "P" (not shown) pivoting means "P" may, for example, be in the form of ball 17 shown in FIG. 2. Member 4 is mounted on lever 5 by means of hub 28 which may be adjusted up or down lever 5 by means of a set screw 35 in hub 28. Flexible cables 7, 8 and 9 previously described with respect to FIGS. 1 and 2, are connected to member 4 in such a manner as not to impose any pushing forces thereon in accordance with the invention when lever 5 is moved into any one of the particular plurality of gear position stations required from the control system of the invention. Cables 7, 8 and 9 are directed by means of rollers 10 to their respective connection with the driven member (not shown) of the control system of the invention. Although mounted on lever 5, member 4 is able to move in a substantially planar manner as a result of movement of lever 5.

Figure 4:
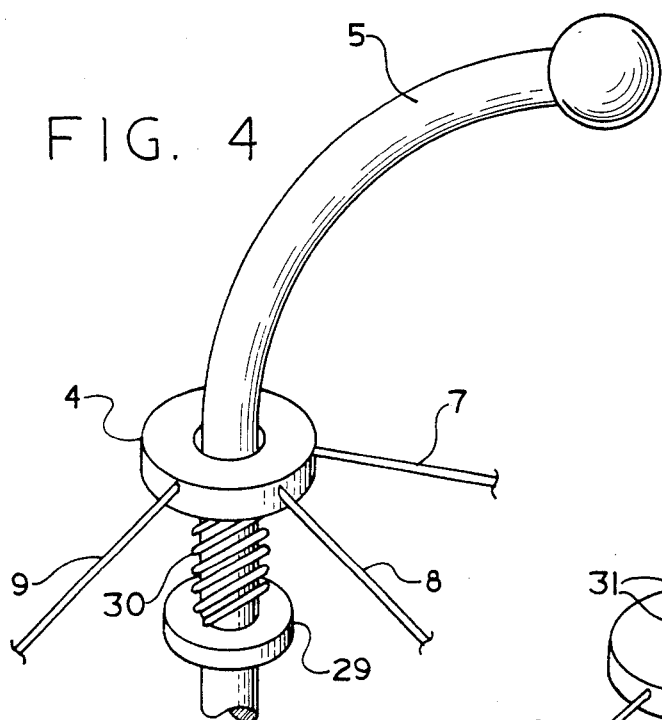
FIG. 4 shows a partial perspective view of an embodiment of a means for biasing and maintaining tension on the force transmitting connecting member of the control system of the invention.

FIG. 4 shows a variation of the embodiment of FIG. 3 in which driver member 4 is moveably mounted on lever 5. Cables 7, 8 and 9, previously described with respect to FIGS. 1, 2 and 3, are connected to member 4 in the manner required of the invention to prevent pushing forces from being imposed thereon when lever 5 is moved to any one of the plurality of gear change positions required of the transmission which is being controlled. Shoulder 29 is secured by suitable means to lever 5 and biasing means in the form of coiled spring 30 is interposed between shoulder 29 and member 4 in such a manner that it is able to press against member 4 and urge member 4 along lever 5 so as to apply and maintain tension upon the particular force transmitting connecting members being used in the control system of the invention as long as the tension does not interfere with the desired movement of lever 5. A plurality of stack curved disc-type springs commonly known in the trade as "Belville" springs such as springs 36 shown in FIG. 5 may also be used to advantage for biasing means 30 where a substantially constant force is desired over the adjustment travel desired along lever 5. Tensioning, such as provided by biasing means 30, is particularly advantageous in maintaining minimum slack in the center position of member 4 without overtightening the cables when they are operated away from center.

Figure 5:
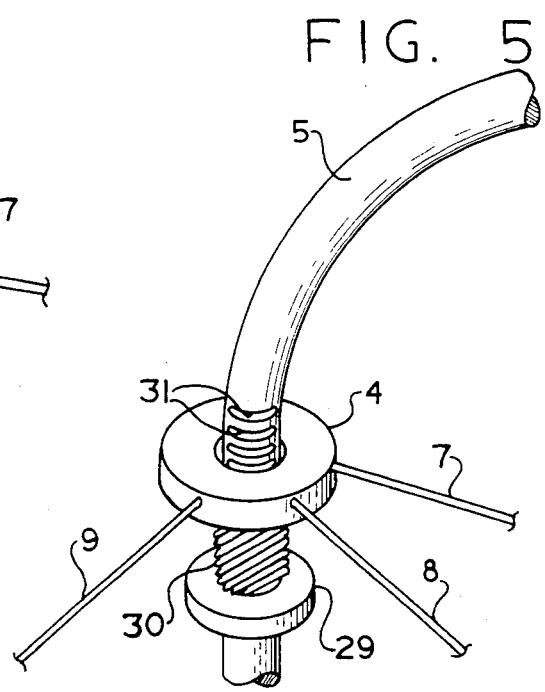
FIG. 5 shows a partial perspective view of the embodiment of FIG. 4 including a ratchet means for maintaining tension upon the force transmitting connecting members of the control system of the invention.

FIG. 5 shows a variation in the embodiment of FIG. 4 in which ratchet means (not shown) are mounted on member 4 to releasably interlock member 4 with lever 5 by interlocking with respective grooves 31 in lever 5 as member 4 moves along member 5 away from shoulder 29. Such ratchet means is advantageous where, for example, cables 7, 8 and 9 have become stretched after extended use. Since member 4 is able to freely slide along lever 5 in a direction away from shoulder 29, cables 7, 8 and 9 are tightened to a tension determined by the force of biasing means 30 and since the ratchet means prevents member 4 from moving toward shoulder 29, the automatic tightening of cables 7, 8 and 9 is maintained due to the aberation of arc length associated with the control system of the invention. It is to be understood that embodiments of the manual control means also include designs in which member 4 is able to move along lever 5 in a direction opposite to the direction shown in FIGS. 3, 4 and 5.

Figure 6:
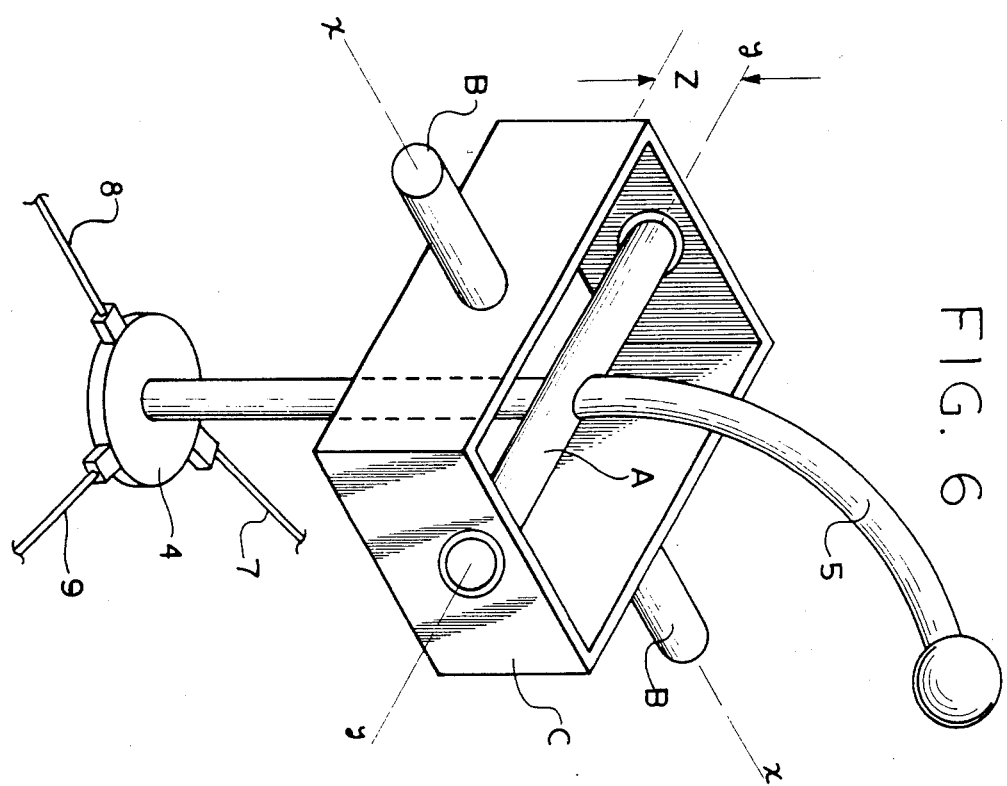
FIG. 6 shows a perspective view of an embodiment of a manual means of moving the driven member of the control system of the invention.

FIG. 6 shows an embodiment of a manual control means of moving driver member 4 of the control system of the invention that is able to pivot in two different planes and provide different degrees of leverage to cables 7, 8 and 9. In FIG. 6, lever arm 5 is secured to frame "C" by means of hub "A" having axis "y"—"y". Diametrically apposed hubs "B" having axis "x"—"x" extend from opposite sides of frame "C" and are adapted for rotatable securement in a fixed frame not shown in FIG. 6. Hub "A" is adapted to rotate with respect to frame "C" and force transmitting members in the form of flexible cables 7, 8 and 9 are secured to driver member 4 in accordance with the invention at the bottom of lever 5. When lever 5 is moved in either direction along axis "x"—"x", lever 5 pivots about axis "y"—"y". When lever 5 is moved in either direction along axis "y"—"y", Frame "C" is caused to pivot about axis "x"—"x". Axis "x"—"x" and "y"—"y" are displaced from each other by the distance "Z" along lever 5. As a result of the displacement "Z", the leverage applied to member 4 will differ according to whether lever 5 is pivoted about axis "x"—"x" or "y"—"y". Such displaced distance "Z" can be used to advantage where it is desirable to apply different leverage to cables 7, 8 and 9 depending upon which direction lever 5 is moved. The embodiment is illustrative of the fact that the manual control means associated with the control system of the invention may be of any design that is able to move and position member 4 in the manner desired.

Figure 7:
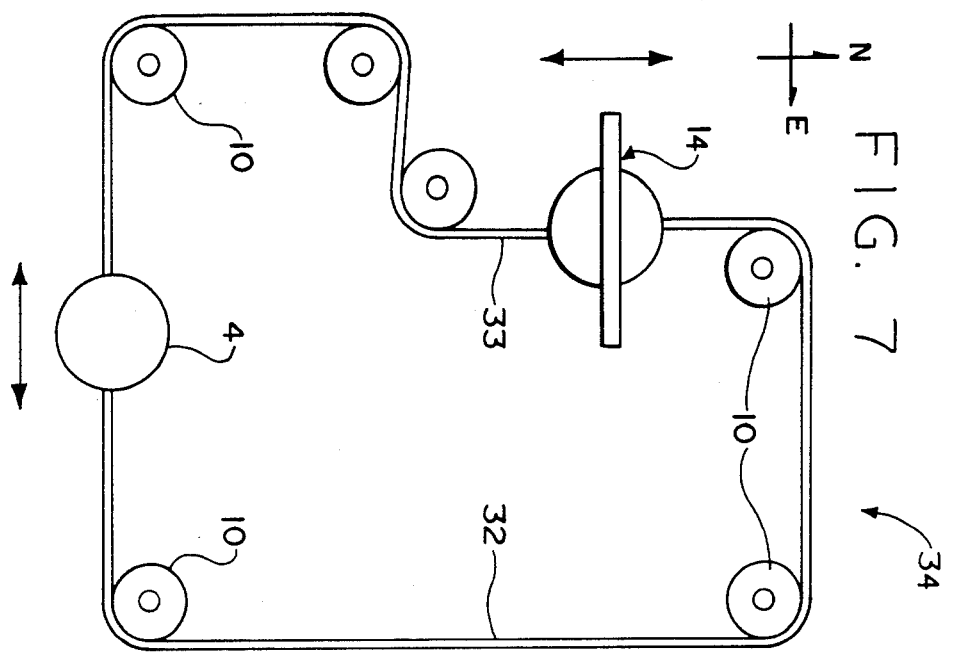
FIG. 7 shows a plan view schematic of an embodiment of the control system of the invention using only two force transmitting connecting members.

FIG. 7 shows a schematic of an embodiment of control system 34 of the invention that uses only two force transmitting connecting members in the form of flexible cables 32 and 33 to connect driver member 4 with driven member 14. Cables 32 and 33 are connected to members 4 and 14 at diametrically apposed positions and are directed by rollers 10. Member 4 may be moved by any suitable manual means operably engaged with member 4 that operably moves member 4 planarly in accordance with the invention. Thus, for example, when member 4 is moved toward the West, member 4 pulls cable 32 which in turn pulls member 14 planarly towards the North. Member 14, being pulled towards the North, pulls on cable 33 and eliminates any pushing force on cable 33 that might otherwise arise by member 4 being moved towards the West. The two cable embodiment of FIG. 7 is particularly advantageous where it is desired that driven member 14 only move back and forth along a single direction such as for example where member 14 is operably connected to the gear change valve of an automatic transmission that is only required to be moved back and forth along a single direction.

One of the unexpected characteristics of the invention is that the cables are self-tightening as the driven member is moved away from center. Theoretically any interconnected system which uses three or more cables for transmission of movement and load has an inherent aberation in movement away from center due to arc length differences traversed by the connecting members at their connection point to the driver and driven members causing the cables to tend to bind up with movement away from center. However, in application as a transmission shift control system, this apparent disadvantage unexpectedly becomes a unique characteristic advantage. Since all cable systems can have some free play and do have some stretch in the connecting flexible cables, the aberation due to arc length has the effect of taking up all free play and tensioning the cables so that they can accept the shifting loads of the transmission with minimum spongy feel and maximum control of movement.

Although such can be readily determined for other connection configurations of the force transmitting member to the driver and driven members of the control system of the invention, it has been found that when three flexible cables are connected to the driven member substantially equidistant from each other in a circular configuration, a cable arc length between the driven member and the closest roller guide (or location where the outer protective member, if any, of a cable having an inner member slidingly engaged within an outer protective member is fixedly secured) of preferably more than one and less than about fifteen and more preferably about six times the total planar movement of the transmission actuator in a single direction is preferred for providing the self-tensioning effect. Thus, for example, if it is desired to move the driven member one inch from center in a single direction along a given plane the length of each of the three cables between the driven member and the closest roller guiding the cable or closest point at which the outer protective covering, if any, of the cable is rigidly fixed should be about six inches or otherwise expressed as a ratio of 6 to 1. Under the circumstances of such three cable connection configuration, a ratio of less than 6 to 1, for example 1 to 1, will cause the cables to overtighten and will prohibit reaching the maximum travel away from center desired. If, for example, the ratio is greater than 6 to 1 as, for example, 20 to 1, the self-tensioning ability of the control system of the invention will be ineffective. For such reason, the term "secured in such a manner" as used herein includes both the positional location at which the force transmitting members in the form of cables are connected to the driver and driven members as well as providing for a ratio as described above that produces a self-tensioning effect on the cables in conjunction with providing the amount of planar travel required for the driven member to activate the transmission gear in the manner desired.

A manual transmission has two modes of gear selection: one being the movement to select the proper shift rail; and the other being the movement of the rail to actually engage the gear. The unique properties of the self-tightening control system of the present invention allows a very light and free mechanism in the select mode of the shifter where the load to move the transmission is very slight and yet the ability to "feel" the gear selection is critical requiring a high cable efficiency characteristic of lightly loaded tension cables. In the transmission gear engage mode, the lever is moved away from center and has to transmit considerable force to overcome the dentent mechanism of the shift rail usually around 100 lbs. Since, as the driven member of the control system of the invention is moved away from center, the cables are self-tightening, the ability of the cables to carry greater load is enhanced without stretch by tensioning the cables automatically as the greater load carrying requirement is needed which results in precise gear selection and a good solid "feel".

The control system of the present invention is therefore able to use a plurality of force transmitting connecting members such as flexible cables to actuate a transmission gear change mechanism by only the pulling forces imposed upon the driven member and force transmitting connecting members of the system operably connected to the mechanism which in turn eliminates the requirement of imposing pushing forces upon the force transmitting members connecting the driven member to the driven member of the control system.

What is claimed is:

1. A self-tensioning control system for controlling the position of a transmission gear change mechanism, said system comprising;
    a first support member having a surface oriented along a plane,
    a driver member moveably engaged with said first support member,
    manual control means operably engaged with said driver member and adapted to move and position said drive member into any one of a plurality of predetermined gear positions,
    a second support member having a surface oriented along a plane,
    a driven member moveably engaged with said second support member, said driven member operably connected to said transmission gear change mechanism in such a manner as to cause said transmission gear change mechanism to change the gear position in the manner desired in response to the movement of the driven member,
    at least said driven member moveably engaged with said second support member in such a manner as to be substantially limited to move in any direction along a second plane substantially parallel to the surface plane,
    a plurality of flexible force transmitting members individually connecting said driver and said driven members together and adapted to move and position said driven member in a predetermined manner in response to the movement of said driver member,
    said force transmitting members connected to said driver and said driven members in such a manner that only tensioned pulling forces are applied respectively thereto in response to movement and positioning of said driver member in any one of said plurality of gear positions by said manual control means.

2. The control system of claim 1 wherein said force transmitting members are in the form of flexible cables.

3. The control system of claim 2 wherein at least one of said cables is slidingly disposed within an outer protective member that is restricted against movement with respect to said first and said second support members.

4. The control system of claim 1 having only two force transmitting members that are in the form of flexible cables individually connected to said driver and said driven members in such a manner that only tensional pulling forces are applied to said driven member to move and position said driven member in response to movement and positioning of said driver member in any one of said plurality of predetermined gear positions.

5. The control system of claim 1 having only three force transmitting members that are in the form of flexible cables individually connected to said driver and said driven members in such a manner that only tensional pulling forces are applied to said driven member to move and position said driven member in response to movement and positioning of said driver member in any one of said plurality of gear positions.

6. The control system of claim 1 wherein said manual control means is in the form of a lever pivotally mounted to said first support member.

7. The control system of claim 1 wherein said driver member is moveably engaged with said first support member in such a manner as to be able to move in any direction along the surface plane thereof.

8. The control system of claim 7 wherein said driver and said driven members are respectively moveably engaged with said first and said second support members by being rollingly engaged respectively therewith by means of ball bearings interposed between said driver member and said first support member surface and between said driven member and said second support member surface and said force transmitting members comprise three flexible cables individually connected in a circular configuration at about the same location respective to both said driver and said driven members and substantially circumferently equidistant from each other.

9. The control system of claim 7 wherein said driver and said driven members are moveably engaged respectively with said first and said second support member surfaces by being rollingly engaged respectively therewith by means of ball bearings interposed respectively between said driver member and said first support member surface and between said driven member and said second support member surface.

10. The control system of claim 1 wherein said driver and driven members are in the form of plates.

11. The control system of claim 1 wherein said driver member is moveably engaged with said first support member by being mounted on said manual control means.

12. The control system of claim 11 wherein said force transmitting members comprise three flexible cables individually connected in a circular configuration at about the same location respective to both said driver and said driven members and substantially circumferentially equidistant from each other.

13. The control system of claim 12 wherein said driver member is moveably mounted on said manual control means and biasing means is mounted on said manual control means in such a manner as to press against said driver member and apply and maintain tension on said cables.

14. The control system of claim 13 including ratchet means mounted on said driver member to releasably interlock said driver member with interlock means disposed on said manual control means to maintain tension upon said cables as said cables become stretched due to useage.

15. The control system of claim 13 wherein said biasing means is in the form of a coiled spring.

16. The control system of claim 13 wherein said biasing means is in the form of a plurality of stacked curved disc-type springs adapted to provide a substantially constant force upon said cables.

* * * * *